Figure 1:
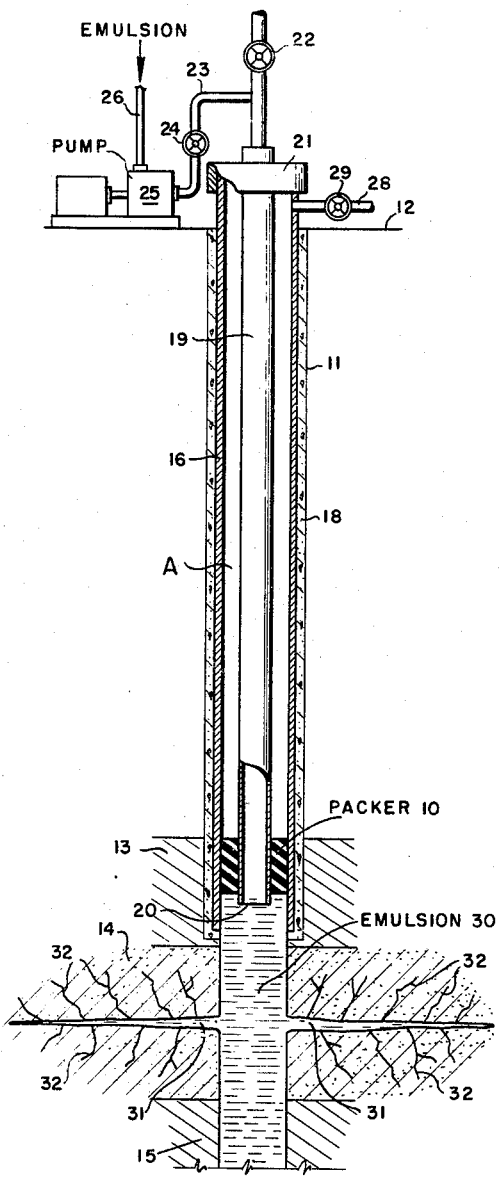

2,935,129
Patented May 3, 1960

2,935,129

FRACTURING EARTH FORMATION

Thomas O. Allen, Bellaire, and Gerald G. Priest, Houston, Tex., assignors, by mesne assignments, to Jersey Production Research Company, Tulsa, Okla., a corporation of Delaware Application April 5, 1957, Serial No. 650,957

1 Claim. (Cl. 166—42)

The present invention is directed to a method for fracturing subsurface earth formations. More particularly, the invention is directed to a method for increasing the permeability of a subsurface earth formation, containing valuable fluids, which is penetrated by a well. In its more specific aspects, the invention is concerned with increasing the permeability of a subsurface earth formation without affecting adversely the formation matrix permeability.

In fracturing formations it has been customary to employ a fracturing fluid which may be a gelled crude oil, an emulsified crude oil or a fluid such as acid gel and the like, to which has been added a solid propping agent, such as sand. In employing these fracturing fluids which may contain wetting agents and the like, it has been customary to impose on the fracturing fluid a sufficient pressure in excess of the breakdown pressure of the formation to cause cracks or fractures in the formation and thus increase the permeability thereof.

An undesirable aspect of the conventional fracturing operations has been the loss in permeability suffered by the formation matrix as a result of contact with the fracturing fluid. For example, while the permeability of the formation is increased by the production of or opening up of fractures in the formation which, in effect, is opening up channels through which drainage may take place, the fracturing fluid in contacting the formation ordinarily reduces the permeability of the formation of rock matrix. Thus, while a channel may be opened up, the permeability of the matrix adjacent the channel will be damaged so that oil and/or gas will be hindered from draining into the channel to the extent that the ultimate recovery of oil and/or gas after initial increase of production will be substantially impaired. Thus, the fracturing fluid results in plugging of the matrix of the rock or formation which adversely affects permeability and also ultimate recovery of hydrocarbons, such as oil, gas, and the like.

In the present invention, fracturing of formations is obtained to increase the permeability thereof without affecting adversely the formation matrix permeability. This is accomplished in the present invention by locating adjacent a formation and in contact therewith an emulsion of water and oil and then imposing sufficient pressure on the emulsion for a sufficient length of time to fracture the formation. Thereafter, the well is produced to remove the emulsion and obtain the valuable fluids in the formation, such as oil, gas, and the like. In the practice of the present invention, the emulsion employed is one containing oil and water with the water containing a water-soluble inorganic compound which serves to provide an emulsion having a low fluid loss or a low filtration rate. The emulsion of the present invention is characterized by having a falling rate of the solid propping agent, such as sand, and the like, in the range from about 0 to about 5 feet per minute. The emulsion is further characterized by being free from compounds which have an appreciable adverse effect on the formation matrix permeability.

Compounds which affect adversely the formation matrix permeability are compounds such as fatty acid soaps, asphaltic materials, insoluble solids formed in situ, and the numerous well stimulating compounds which have come into recent common use in the art. It has been discovered that compounds of this nature adversely affect the formation matrix permeability and damage the fractured formation to such an extent that the beneficial effects of the fracturing operation are substantially negatived.

The emulsion employed in the practice of the present invention is used in the sense of the emulsions described in Sutheimn's "Introduction of Emulsions," Chemical Publishing Company, Inc., Brooklyn, New York, 1947, page 1 where an emulsion is described as follows:

"Emulsions are intimate mixtures of two immiscible liquids, one of them being dispersed in the other in the form of fine droplets."

The emulsions of the present invention contain a water soluble inorganic compound or salt. These compounds serve to control and mitigate, alleviate and entirely eliminate damage to the formation by loss of permeability.

The oily phase of the emulsion may suitably be a hydrocarbon, such as asphalt-free crude petroleum and fractions thereof, such as gasoline, kerosene, gas oil, diesel oil, and the like. Other hydrocarbonaceous materials or derivatives of hydrocarbons, such as carbon tetrachloride, and the like, may form all or part of the oily phase.

The emulsion suitably may have a density in pounds per gallon in the range from about 7 to about 18 pounds per gallon. The viscosity of the emulsion may range from about 10 to about 4000 centipoises at 60° F.

The water-soluble compound which may suitably be a water-soluble inorganic metal salt may be termed as formation damage control agents and suitably may include the alkali metal salts, alkaline earth metal salts and other inorganic compounds. Typical suitable water-soluble inorganic compounds suitable for use in the practice of the present invention are shown in Table I:

TABLE I

| Name: | Formula |
|---|---|
| Aluminum bromide | $AlBr_3$ |
| Aluminum chloride | $AlCl_3$ |
| Aluminum iodide | $AlI_3$ |
| Ammonium bromide | $NH_4Br$ |
| Ammonium iodide | $NH_4I$ |
| Ammonium nitrate | $NH_4NO_3$ |
| Ammonium phosphate, dibasic | $(NH_4)_2HPO_4$ |
| Antimony trichloride | $SbCl_3$ |
| Antimony trifluoride | $SbF_3$ |
| Barium acetate | $Ba(C_2H_3O_2)_2$ |
| Barium bromide | $BaBr_2$ |
| Barium iodide dihydrate | $BaI_2.2H_2O$ |
| Barium iodide hexahydrate | $BaI_2.6H_2O$ |
| Barium nitrite | $Ba(NO_2)_2$ |
| Cadmium acetate | $Cd(C_2H_3O_2)_2$ |
| Cadmium bromate monohydrate | $Cd(BrO_3)_2.H_2O$ |
| Cadmium bromide | $CdBr_2$ |
| Cadmium chlorate | $Cd(ClO_3)_2$ |
| Cadmium chloride | $CdCl_2$ |
| Cadmium iodide | $CdI_2$ |
| Cadmium nitrate tetrahydrate | $Cd(NO_3)_2.4H_2O$ |
| Cadmium sulfate heptahydrate | $CdSO_4.7H_2O$ |
| Cadmium bromate monohydrate | $Cd(BrO_3)_2.2H_2O$ |
| Calcium bromide | $CaBr_2$ |
| Calcium chloride | $CaCl_2$ |
| Calcium iodide | $CaI_2$ |
| Calcium nitrate | $Ca(NO_3)$ |
| Cupric bromate hexahydrate | $Cu(BrO_3)_2.6H_2O$ |
| Cupric bromide | $CuBr_2$ |
| Cupric chloride | $CuCl_2$ |

| Name | Formula |
|---|---|
| Cupric nitrate hexahydrate | $Cu(NO_3)_2 \cdot 6H_2O$ |
| Ferric chloride | $FeCl_3$ |
| Ferric nitrate hexahydrate | $Fe(NO_3)_3 \cdot 6H_2O$ |
| Ferric sulfate monohydrate | $Fe_2(SO_4)_3 \cdot 9H_2O$ |
| Ferrous bromide | $FeBr_2$ |
| Ferrous chloride | $FeCl_2$ |
| Lead acetate trihydrate | $Pb(C_2H_3O_2)_2 \cdot 3H_2O$ |
| Lead chlorate monohydrate | $Pb(ClO_3)_2 \cdot H_2O$ |
| Lead nitrate | $Pb(NO_3)_2$ |
| Lithium bromide | $LiBr$ |
| Lithium iodide | $LiI$ |
| Magnesium bromide | $MgBr_2$ |
| Magnesium iodide | $MgI_2$ |
| Manganese bromide | $MnBr_2$ |
| Manganese chloride tetrahydrate | $MnCl_2 \cdot 4H_2O$ |
| Manganese iodide | $MnI_2$ |
| Nickel bromide | $NiBr_2$ |
| Nickel nitrate hexahydrate | $Ni(NO_3)_2 \cdot 6H_2O$ |
| Potassium acetate | $KC_2H_3O_2$ |
| Potassium fluoride | $KF$ |
| Potassium iodide | $KI$ |
| Potassium nitrite | $KNO_2$ |
| Potassium phosphate | $K_3PO_4$ |
| Sodium bisulfate | $NaHSO_4$ |
| Sodium bromide | $NaBr$ |
| Sodium chlorate | $NaClO_3$ |
| Sodium chloride | $NaCl$ |
| Sodium iodide | $NaI$ |
| Sodium nitrate | $NaNO_3$ |
| Sodium nitrite | $NaNO_2$ |
| Sodium phosphate monobasic | $NaH_2PO_4 \cdot 2H_2O$ |
| Zinc bromide | $ZnBr_2$ |
| Zinc chloride | $ZnCl_2$ |
| Zinc Iodide | $ZnI_2$ |
| Zinc nitrate hexahydrate | $Zn(NO_3)_2 \cdot 6H_2O$ |
| Zinc sulfate | $ZnSO_4$ |

The emulsion employed in the present invention will suitably consist essentially of from about 5% to about 95% by volume of water with a preferred range of from about 20% to about 80% by volume of water, from about 5% to about 95% by volume of oil with a preferred range of from about 20% to about 80% by volume of oil and an emulsifying agent in an amount in the range from about 0.5 to about 20 grams per 100 ml. of the external phase of the emulsion. The weight percent of the inorganic metal compound or salt dissolved in the aqueous or water phase of the emulsion may suitably range from about 1% up to about saturation in the aqueous or water phase of the emulsion.

The solid propping agent employed in the emulsion will suitably range from about ½ lb./gal. to about 6 lb./gal. of the emulsion and may include sand, quartz, crushed walnut shells, and other coarse or fine aggregate having particle sizes in the range from about 10 to about 140 mesh. The purpose of the solid propping agent is to be carried into the fractures formed in the formation and lodged therein to prop the channels or fractures in an open condition after the emulsion has been removed therefrom.

The emulsions employed in the practice of the present invention may include suitable fatty acid soap-free emulsifying agents such as alkali or alkaline earth metal salts of lignosulfonic acid, esters of fatty acids, esters of mixed fatty and resin acids, and the like. In Table II the identity and compositions of emulsifying agents suitable for use in the present invention are presented.

The emulsion or fracturing fluid employed in the present invention may be either an oil-in-water emulsion or a water-in-oil emulsion. Stating this otherwise, water may be either the internal or external phase of the emulsion. When an oil-in-water emulsion is employed as the fracturing fluid, it may suitably contain a film strengthening agent of the type illustrated in Table III.

TABLE II

| Trade Designation | Chemical Composition | Class of Agent | Manufacturer |
|---|---|---|---|
| Span 80 | Sorbitan monooleate | Non-ionic | Atlas Powder Co. |
| Arlacel "C" | Sorbitan sesquioleate | do | Do. |
| Atpet 100 | Unpurified sorbitan monooleate | do | Do. |
| Renex 30 | Polyoxyethylene esters of mixed fatty and resin acids. | do | Do. |
| Tween 60 | Polyoxyethylene sorbitan monostearate | do | Do. |
| Brij 30 | Polyoxyethylene lauryl alcohol | do | Do. |
| G-7596J | Polyoxyethylene sorbitan monolaurate | do | Do. |
| Saltkem | Sodium lignosulfonate | Anionic | Marathon Corp. |
| G-2854 | Polyoxyethylene sorbitol tetraoleate | Non-ionic | Atlas Powder Co. |
| G-1020 | Polyoxyethylene sorbitol monolaurate | do | Do. |
| Span 20 | Sorbitan monolaurate | do | Do. |
| Kembreak | Calcium lignosulfonate | Anionic | Marathon Corp. |

TABLE III

| Trade Designation | Chemical Composition | Manufacturer |
|---|---|---|
| Filcon SPF [1] | A sulfonated polymer | Monsanto Chemical Company. |
| Driscose [2] | Sodium carboxymethyl cellulose | Hercules Powder Company. |
| 70-H CMC | do.[3] | Do. |
| 70-SH CMC | do.[4] | Do. |
| 70-DH CMC | do.[5] | Do. |
| 120-H CMC | do.[6] | Do. |
| Impermex | Pregelantized starch | Baroid Sales Div. of Nat'l Lead Co.[7] |
| Guar Flour | Milled endosperm of guar seeds | General Mills, Inc. |
| Saltkem | Sodium lignosulfonate | Marathon Corporation. |
| XHi Vis. CMC | Sodium carboxymethyl cellulose [8] | Dow Chemical Co. |
| Lustrex W | Sulfonated polystyrene [9] | Monsanto Chemical Company. |

[1] Filcon is a registered trade name of Monsanto Chemical Co., the manufacturer.
[2] Average of 0.7 sodium carboxymethyl group per anhydroglucose unit, medium viscosity form, viscosity of 2% solution at 25° C., 100–300 cp.
[3] Average of 0.7 sodium carboxymethyl group per anhydroglucose unit, high viscosity form, viscosity of 1% solution at 25° C., 1300–2200 cp.
[4] Average of 0.7 sodium carboxymethyl group per anhydroglucose unit, special high viscosity form, viscosity of 1% solution at 25° C., 1300–2200 cp.
[5] Average of 0.7 sodium carboxymethyl group per anhydroglucose unit, densified form of CMC-70 H.
[6] Average of 0.7 sodium carboxymethyl group per anhydroglucose unit, high viscosity form, viscosity of 1% solution at 25° C., 100–300 cp.
[7] A supplier.
[8] Average of about 0.3 to 0.4 sodium carboxymethyl group per anhydroglucose unit, extra high viscosity form.
[9] Lustrex W is registered trade name of Monsanto Chemical Company, the manufacturer.

Figure 2:
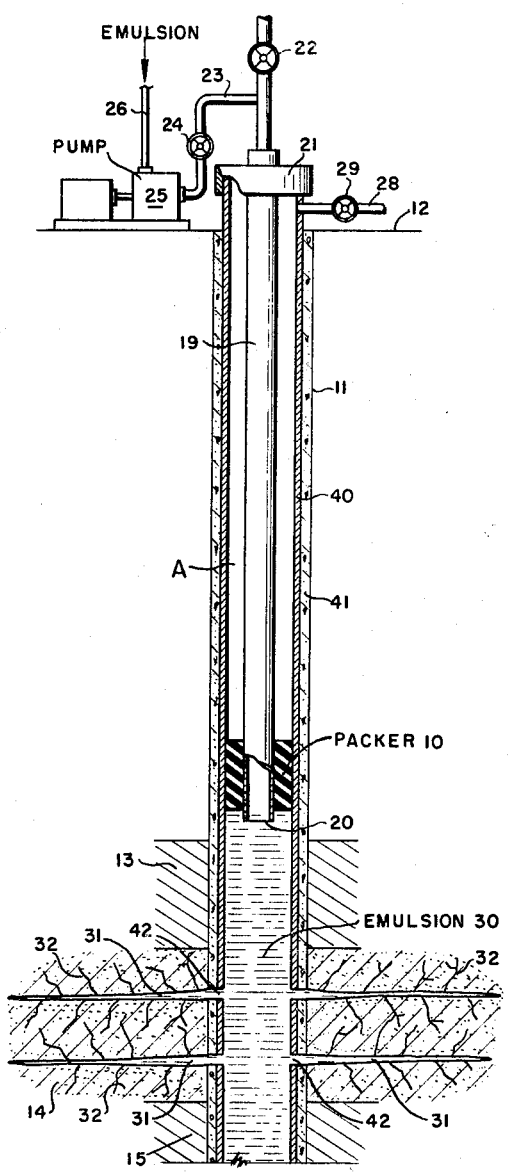

The invention will be further illustrated by reference to the drawing in which:

Fig. 1 illustrates apparatus suitable for practicing the present invention in an open hole; and Fig. 2 illustrates a well where fracturing is accomplished through perforations in a well casing.

Referring now to the drawing and particularly to Fig. 1, a borehole, such as 11, is drilled from the earth's surface 12 to penetrate a plurality of subsurface earth formations 13, 14, and 15, any of which may be productive of valuable earth fluids such as oil, gas, and the like. In the practice of the present invention it may be assumed that formation, sand, interval, stratum, horizon or zone 14 is productive of hydrocarbons.

A casing, such as 16, is set in the well 11 such that its lower end is arranged above the formation 14, the casing being cemented in place with primary cement 18. A tubing string, such as 19, is set in the well with its lower open end 20 above the formation 14 and the casing-tubing annulus A has been closed off adjacent the lower open end of the tubing string 19 by means of a tubing packer such as 10, a description of which may be found in the Composite Catalog of Oil Field and Pipeline Equipment, 20th edition, 1954–55, at page 875. The well 11 and the casing 16 and tubing 19 are closed in at the earth's surface by well head equipment generally indicated by numeral 21, the tubing being provided with a valve 22 forming part of the usual Christmas tree arrangement and being provided with a conduit 23 containing a valve 24 which connects into a pump 25. The pump 25 connects by line 26 to a source of the emulsion employed in the present invention.

In practicing the present invention in accordance with the embodiment of Fig. 1, the formation 14 may be isolated from the other formations by means such as shown in which the casing is cemented in place. Emulsion is then pumped into the well below the casing and tubing by lines 26, pump 25 and line 23 and thence by way of tubing string 19. The packer 21 may be opened to allow displacement up the annulus A and outwardly therefrom through a conduit, such as 28, controlled by a valve such as 29. After the emulsion has been arranged in a body, such as 30, pressure is built up on the body of emulsion 30 until it exceeds the breakdown pressure of the formation 14 which results in the formation of one or more fractures or channels, such as 31; communicating therewith may be a plurality of lateral or vertical channels or fractures 32. These channels or fractures, such as 31, may extend outwardly from the well 11 as much as 1000 feet, the pressure being imposed on the formation for a length of time sufficient to fracture the formation 14 and to extend the fractures the distance indicated. For example, in fracturing a formation in the Texas fields, the pressure imposed thereon may range from about 500 to about 15,000 pounds per square inch gauge and the time the pressure is imposed may range from 0.1 to about 2 hours. As a result of this treatment with the particular emulsion as described herein, the channel, such as 31, with the lateral channels, such as 32, are formed and propped open with the sand or solid propping agent carried by the emulsion in the present invention. As a result of employing the particular emulsion, the rock matrix adjacent the fractures in the formation, such as 14, is not adversely affected to an appreciable degree in that the permeability is not impaired by contact with the fracturing fluid. Thus the fracturing fluid has a low fluid loss or filtration rate, has the ability to retain the sand or propping agent and is characterized by not containing compounds which adversely affect, to a considerable degree, the formation, such as 14.

Referring now to Fig. 2, a well bore, such as 11, drilled from the earth's surface, such as 12, has a casing 40 arranged therein which extends throughout the depth of the well, the casing 40 being cemented in place with primary cement 41. The tubing string 19 is arranged with its lower open end 20 above the uppermost of the formations 13 with the annulus A being closed in by means of the packer 10, such as has been described. It is understood, of course, that the packer 10 may be omitted and when such is done the fracturing fluid will be pumped from line 26 down the annulus A.

In this particular instance the casing 40 has been penetrated or perforated by means of a gun, such as a bullet or shaped charge or a mechanical or chemical type perforator lowered through the tubing string 19 and placed adjacent the formation 14 and then operated or fired to form perforations, such as 42, in the casing 40, cement 41, and into the formation 14. After the perforation, the emulsion which may have previously been spotted has pressure imposed on it by means of pump 25, conduit 23, and tubing string 19 to cause the formation of the channels or fractures 31 and the lateral channels or fractures 32.

Thus, in accordance with this embodiment of the present invention, the formation 14 is fractured by perforating the casing and then imposing pressure with the emulsion in accordance with the present invention to allow the fractures 31 to extend as much as 1000 feet from the well 11.

The embodiments of Figs. 1 and 2 may suitably be employed in accordance with the teachings of the permanent well completion technique, that is, the tubing 19 may have its lower open end arranged above the plurality of hydrocarbon productive intervals and the well completed, such as by fracturing, with the emulsion of the present invention successively to form fractures in the several formations to increase the permeability thereof without appreciable damage to the formation matrix permeability.

TABLE IV

*Results of fracturing fluid formation damage tests grouped by types of fluids*

| Type Fracturing Fluids Tested Including Base Oils Used | Test Temp., °F. | Core Permeability, md. | | Permeability Recovered at Given Pressure, Percent |
|---|---|---|---|---|
| | | Before | After | |
| Gelled Crudes: | | | | |
| Halliburton Visofrac— | | | | |
| Means-San Andres | 100 | 51 | 6.5 | 13 |
| Pampa-Wolfcamp | 85 | 88 | 11.0 | 13 |
| Jay Simmons-Frio | 180 | 89 | 1.0 | 1 |
| Raven Creek-Canyon & Strawn | 146 | 55 | 3.0 | 5 |
| East Bartlett-Swastika | 113 | 65 | 13.0 | 20 |
| Dowell Petrogel— | | | | |
| Means-San Andres | 100 | 71 | 5.0 | 7 |
| Raccoon Bend-Sparta | 180 | 54 | 29.0 | 54 |
| Pampa-Wolfcamp | 85 | 68 | 1.0 | 1 |
| Fargo-Canyon | 135 | 51 | 30.0 | 59 |
| East Bartlett-Swastika | 113 | 57 | 17.0 | 30 |
| Western Control-Frac— | | | | |
| Means-San Andres | 100 | 56 | 16.0 | 29 |
| Pampa-Wolfcamp | 85 | 65 | 1.0 | 2 |
| Jay Simmons-Frio | 180 | 88 | 15.0 | 17 |
| Foster-Grayburg & San Andres | 100 | 77 | 7.0 | 9 |
| Emulsified Crudes: | | | | |
| Halliburton Emulsifrac— | | | | |
| Jay Simmons-Frio | 180 | 107 | 61.0 | 57 |
| Jay Simmons-Frio | 180 | 77 | 41.0 | 53 |
| Means-Queen | 92 | 80 | 47.0 | 59 |
| Kelsey-Frio (Zones K$_1$, K$_3$, M$_2$) | 165 | 71 | 38.0 | 54 |
| Kelsey-Frio (Zone 21) | 180 | 71 | 35.0 | 49 |
| East Texas-Woodbine | 146 | 66 | 18.0 | 27 |
| Dowell Petrofrac— | | | | |
| Jay Simmons-Frio | 180 | 89 | 8.0 | 9 |
| Kelsey-Frio (Zones K$_1$, K$_3$, M$_2$) | 165 | 71 | 22.0 | 31 |
| Raven Creek-Canyon & Strawn | 146 | 65 | 10.0 | 15 |
| Kelsey-Frio (Zone 21) | 180 | 63 | 11.0 | 17 |
| East Texas-Woodbine | 146 | 59 | 12.0 | 20 |

To illustrate the nature of the detrimental effect of the conventional fracturing fluids on formations, operations were conducted to show the effect of the formation damage resulting from the use of conventional fracturing fluids. In performing these operations, a Berea sandstone core 3½ inches in diameter and 5 inches long is condtioned to specific salt water and kerosene saturations approximating connate water and original oil saturations which exist in reservoirs. The prepared core is then mounted in a high pressure core holder and its permeability to filtered evacuated kerosene is measured at inlet and outlet pressures of 1,800 and 1,700 p.s.i.g., respectively. In the case of the gelled or emulsified crude tests., the base crude is filtered; then the gel or emulsion is prepared. The fracturing fluid thus prepared is injected into the core, at the temperature of the reservoir from which the crude was produced, at a constant inlet pressure of 1,800 p.s.i.g. but with varying pressure differentials across the core. The pressure differential is maintained at 100 p.s.i. for 10 minutes, 200 p.s.i. for 10 minutes, 300 p.s.i. for 10 minutes, 400 p.s.i. for 10 minutes, and 500 p.s.i. for the last 10 minutes. The core is then back-flowed with filtered evacuated kerosene at 1,800 p.s.i.g. inlet pressure while maintaining pressure differentials across the core at 1 p.s.i. for 2 hours, 10 p.s.i. for 2 hours, and 100 p.s.i. for at least 4 hours, or until the rate of flow ceases to increase. This backflow phase is designed to simulate the initiation of production following a fracturing job and to remove plugging materials deposited by the fracturing fluid which might be flushed out following a well treatment. After making certain that the flow rate through the core is no longer increasing, the permeability of the core to filtered evacuated kerosene is measured at 1,800 p.s.i.g. inlet pressure and 100 p.s.i.g. differential pressure for comparison with the earlier measurement. The results of these operations are presented in Table IV.

From these operations it will be clear that the employment of the commercially offered gelled crudes and emulsified crudes results in a substantial loss in the permeability recovered at a given pressure. For example, when using conventional gelled crudes, it will be seen that the permeability after the treatment ranged from 1 to 59% of the permeability before the treatment. With the conventional emulsified crudes, the percentage of the permeability resulting after such a treatment ranged from 9% to 59% of that obtained prior to the treatment. In short, these data show that substantial loss in permeability has been effected by treatment with conventional fracturing fluids.

In order to illustrate the present invention and the beneficial results therefrom, a number of compositions in accordance with the present invention were made up containing the formation damage control compounds. The composition and the characteristics of these emulsions are presented in Table V.

TABLE V
*The composition and properties of several emulsion fracturing fluids*

| Sample Number | External Phase of the Emulsion | Vol. percent | Aqueous Phase | | Oil Phase | | Emulsifier | | Properties of Emulsion | |
|---|---|---|---|---|---|---|---|---|---|---|
| | | | Film Strengthening Agent | Weighting Agent, Wt. percent | Identity | Vol. percent | Identity | Grams/100 ml. External Phase | Density, Lbs./Gal. | API Fluid Loss, cc./30 Min. |
| 1 [1] | Oil | 80 | 70 DH CMC | NaCl (26) | Diesel Oil | 20 | Span 80 | 5.0 | 9.3 | 0.2 |
| 2 [2] | ---do--- | 80 | Filcon (SPF) | NaCl (26) | ---do--- | 20 | ---do--- | 1.0 | 9.3 | 3.0 |
| 3 [2] | ---do--- | 80 | ---do--- | NaCl (26) | ---do--- | 20 | ---do--- | 5.0 | 9.3 | 0.0 |
| 4 [2] | ---do--- | 75 | ---do--- | NaCl (26) | ---do--- | 25 | ---do--- | 5.0 | 9.1 | 0.8 |
| 5 [1] | ---do--- | 75 | 70 DH CMC | NaCl (26) | ---do--- | 25 | ---do--- | 4.0 | 9.1 | 0.5 |
| 6 [1] | ---do--- | 80 | 70 DH CMC | NaCl (5) | ---do--- | 20 | ---do--- | 5.0 | 8.2 | 1.0 |
| 7 | Water | 80 | None | NaCl (26) | ---do--- | 20 | Saltkem | 5.0 | 9.3 | 2.4 |
| 8 | ---do--- | 80 | ---do--- | NaCl (26) | ---do--- | 20 | ---do--- | 6.2 | 9.3 | 0.0 |
| 9 | ---do--- | 72 | ---do--- | NaCl (26) | ---do--- | 28 | ---do--- | 8.0 | 9.1 | 2.2 |
| 10 | ---do--- | 55 | ---do--- | NaCl (26) | ---do--- | 45 | ---do--- | 4.0 | 8.5 | 6.2 |
| 11 | ---do--- | 50 | ---do--- | NaCl (26) | ---do--- | 50 | ---do--- | 4.0 | 8.3 | 8.4 |
| 12 | ---do--- | 40 | ---do--- | NaCl (26) | ---do--- | 60 | ---do--- | 5.0 | 8.3 | 5.8 |
| 13 | ---do--- | 35 | ---do--- | NaCl (26) | ---do--- | 65 | ---do--- | 6.8 | 7.8 | 5.8 |
| 14 | ---do--- | 33 | ---do--- | NaCl (5) | ---do--- | 67 | ---do--- | 16.7 | 7.7 | 2.0 |
| 15 | ---do--- | 30 | ---do--- | NaCl (5) | ---do--- | 70 | ---do--- | 10.0 | 7.6 | 4.6 |
| 16 [2] | Oil | 75 | Filcon (SPF) | CaCl₂ (40) | ---do--- | 25 | Span 80 | 10 | 10.0 | 8.0 |
| 17 [2] | ---do--- | 75 | ---do--- | CaCl₂ (40) | ---do--- | 25 | Arlacel "C" | 10 | 10.0 | 1.0 |
| 18 [2] | ---do--- | 75 | ---do--- | CaCl₂ (40) | ---do--- | 25 | Atpet 100 | 10 | 10.0 | 1.0 |
| 19 [2] | ---do--- | 65 | ---do--- | CaCl₂ (40) | ---do--- | 35 | Span 80 | 12.5 | 9.9 | 1.0 |
| 20 [2] | ---do--- | 60 | ---do--- | CaCl₂ (40) | ---do--- | 40 | ---do--- | 12.5 | 9.7 | 1.8 |
| 21 [2] | ---do--- | 75 | ---do--- | CaCl₂ (25) | ---do--- | 25 | Arlacel "C" | 10.0 | 9.2 | 8.5 |
| 22 | Water | 75 | None | CaCl₂ (3) | ---do--- | 25 | Saltkem | 6.7 | 8.0 | 5.0 |
| 23 | ---do--- | 62 | ---do--- | CaCl₂ (3) | ---do--- | 38 | ---do--- | 10.7 | 7.7 | 2.6 |
| 24 | ---do--- | 62 | ---do--- | CaCl₂ (3) | ---do--- | 38 | ---do--- | 2.7 | 7.7 | 11.0 |
| 25 | ---do--- | 62 | ---do--- | CaCl₂ (3) | ---do--- | 38 | ---do--- | 0.67 | 7.7 | 27.0 |
| 26 | ---do--- | 62 | ---do--- | CaCl₂ (3) | Sparta Crude, Racoon Bend. | 38 | ---do--- | 0.67 | 7.7 | 29.0 |
| 27 | ---do--- | 60 | ---do--- | CaCl₂ (3) | Diesel Oil | 40 | ---do--- | 6.7 | 7.7 | 7.0 |
| 28 | ---do--- | 50 | ---do--- | CaCl₂ (3) | ---do--- | 50 | ---do--- | 10.0 | 7.5 | 2.0 |
| 29 | ---do--- | 38 | ---do--- | CaCl₂ (3) | ---do--- | 62 | ---do--- | 10.7 | 7.3 | 2.6 |
| 30 | ---do--- | 38 | ---do--- | CaCl₂ (3) | ---do--- | 62 | ---do--- | 12.2 | 7.3 | 2.0 |
| 31 | ---do--- | 33 | ---do--- | CaCl₂ (3) | ---do--- | 67 | ---do--- | 16.7 | 7.3 | 0.2 |
| 32 | ---do--- | 50 | ---do--- | CaCl₂ (3) | Racoon Bend, Sparta Crude. | 50 | ---do--- | .67 | 7.7 | 2.0 |
| 33 | ---do--- | 50 | ---do--- | NaCl (5) | Diesel Oil | 50 | ---do--- | 1.0 | 7.6 | 34.0 |
| 34 | ---do--- | 50 | ---do--- | NaCl (5) | ---do--- | 50 | ---do--- | 1.0 | 7.6 | 12.0 |
| 35 | ---do--- | 50 | ---do--- | NaCl (5) | ---do--- | 50 | Tween 60 / Saltkem | 1.0 / 0.5 | 7.6 | 20.0 |
| 36 | ---do--- | 50 | ---do--- | NaCl (26) | ---do--- | 50 | Tween 60 and Saltkem. | [4] 2.0 / 0.5 | 8.3 | 19.2 |
| 37 | ---do--- | 50 | ---do--- | NaCl (26) | ---do--- | 50 | | | 8.3 | 33.0 |
| 38 [3] | Oil | 50 | Lustrex-W | CaCl₂ (3) | ---do--- | 50 | Arlacel "C" | 5.0 | 7.55 | 34.0 |
| 39 [3] | ---do--- | 50 | ---do--- | CaCl₂ (10) | ---do--- | 50 | ---do--- | 5.0 | 7.83 | 30.0 |
| 40 [3] | ---do--- | 60 | ---do--- | CaCl₂ (20) | ---do--- | 40 | ---do--- | 5.0 | 8.6 | 11.2 |
| 41 [3] | ---do--- | 50 | ---do--- | CaCl₂ (20) | ---do--- | 50 | ---do--- | 5.0 | 8.2 | 11.8 |
| 42 [3] | ---do--- | 50 | ---do--- | CaCl₂ (20) | ---do--- | 50 | ---do--- | 5.0 | 8.2 | 20.0 |
| 43 [3] | ---do--- | 62 | ---do--- | CaCl₂ (20) | ---do--- | 50 | ---do--- | 5.0 | 9.35 | 18.0 |
| 44 [3] | ---do--- | 50 | ---do--- | NaCl (5) | ---do--- | 50 | ---do--- | 5.0 | 7.6 | 35.0 |
| 45 [3] | ---do--- | 50 | ---do--- | NaCl (26) | ---do--- | 50 | ---do--- | 5.0 | 8.3 | 10.0 |
| 46 [3] | ---do--- | 50 | ---do--- | NaCl (26) | ---do--- | 50 | ---do--- | 5.0 | 8.3 | 24.0 |

[1] In these runs 70 DH CMC was used in amounts of 2 grams/100 ml.
[2] In these runs Filcon (SPF) was used in amounts of 1.25, 1.67, 5.0, 6.7, 6.7, 6.7, 6.7, 6.7 and 6.7 grams/100 ml., respectively.
[3] In these runs Lustrex-W was used in amounts of 1.0, 1.0, 0.5, 0.5, 1.0, 1.0, 0.5, 0.67, and 0.3 grams/100 ml., respectively.
[4] 1 gram each of Tween 60 and Saltkem used.

Typical of these emulsions were employed in operations similar to those described with respect to the runs from which the data represented in Table IV were obtained. The identity of the emulsions which are set out in Table V are referred to in Table VI wherein the properties of the emulsions employed in the formation testing operations are further defined with respect to the sand falling rate.

The term "formation matrix" is used to distinguish between fractured and unfractured portions of a formation. Thus, the unfractured portion of the formation is designated as formation matrix and is said to have matrix permeability. In a formation where induced fractures are formed, much of the oil, gas, or hydrocarbon is contained in the unfractured portion or matrix. When the hydrocarbon is produced it must flow from the matrix to

TABLE VI

*Data on several emulsions tested as fracturing fluids under simulated well conditions*

| Emulsion Sample No.[a] | 40 | 41 | 25 | 26 | 32 |
|---|---|---|---|---|---|
| Emulsion Properties: | | | | | |
| API Fluid Loss, cc./30 min | 11.2 | 11.8 | 27.0 | 29.0 | 29.0 |
| Density, lbs./gal | 8.6 | 8.2 | 7.7 | 7.7 | 7.7 |
| Sand Falling Rate, ft./min | 0.5 | 1.0 | 0.0 | 0.0 | 2.0 |
| Initial Core Permeability, md | 48 | 48 | 92 | 72 | 53 |
| Maximum Injection Pressure Differential, lbs./in.$^2$ | 500 | 500 | 500 | 500 | 500 |
| Cumulative Volume of Fluid Lost at Given Pressure, cc | 240 | 425 | 216 | 170 | 144 |
| Average Fluid Loss Index,[b] cc./md | 5.0 | 8.85 | 2.4 | 2.4 | 2.7 |
| Back Flow Pressure, lbs./in.$^2$ | 100 | 100 | 100 | 100 | 100 |
| Backflow Permeability at Given Pressure, md | 35 | 32 | 80 | 56 | 44 |
| Total Volume Backflowed Through Core, cc | 13,850 | 15,850 | 26,300 | 23,000 | 20,000 |
| Permeability Recovery at Given Pressure, Percent | 73 | 67 | 87.0 | 78.0 | 83.0 |

[a] Expresses ratio of total fluid loss to initial permeability.
[b] Corresponds to emulsion sample number in Table V.

From the results presented in Table VI, it will be seen that the sand falling rate of the several emulsions was very low which indicates that the sand is held in suspension so that it is readily carried into the formation fractures to prop the formations open and furthermore the permeability of the formation matrix has been less adversely affected by employing these emulsions than by employing the fluids listed in Table IV.

The results from Table VI may be compared with the results in Table IV. For example, with gelled crudes the recovered permeability at a given pressure range is from 1% to 59%, whereas the recovered permeability in Table VI ranges from 67% to 99%.

Similar favorable results are shown for the present invention when the data in Table IV for the emulsified crudes are compared with the data in Table VI employing the emulsions set out herein. In Table IV on the emulsified crudes recovered permeabilities ranging from 9% to 59% were obtained, whereas employing the emulsions of the present invention values from 67% to 99% of recovered permeability were obtained.

From these operations it will be clear that the present invention allows substantially improved results in that fracturing of formations is possible without damage to the formation matrix inasmuch as the formation matrix permeability is less adversely affected. In the present invention where appreciable plugging of the formation matrix is not suffered, the fracturing operation increases the production rate to a marked extent immediately and this production rate does not fall off sharply as has been the experience heretofore. In other words, in the practice of the present invention the ultimate recovery is increased, the formation matrix permeability is less adversely affected, and oil is producible economically from formations from which heretofore it was not practicable. Operations have been conducted which show that the emulsion of the present invention may be removed from the fractured formations without carrying the sand propping agent back into the well bore.

the fractures and then to the well bore.

The nature and objects of the present invention having been completely described and illustrated, what we wish to claim as new and useful and to secure by Letters Patent is:

A method for increasing the permeability of a subsurface earth formation containing valuable hydrocarbons penetrated by a well without affecting adversely the formation matrix permeability which comprises locating an emulsion in contact with said formation, consisting of from about 5% to about 95% by volume of water, from about 5% to about 95% by volume of asphalt-free oil, a fatty acid soap-free emulsifying agent in an amount in the range between about 0.2 and about 20 grams per 100 ml. of the external phase of the emulsion, said emulsion having a solid propping agent added thereto, said water containing calcium chloride in an amount in the range from about 1% by weight to about saturation in said water, said emulsion being characterized by having a low fluid loss and having a falling rate for the solid propping agent in the range from 0 to 5 feet per minute and said emulsion being free of compounds which affect adversely said formation matrix permeability, imposing a sufficient pressure in excess of breakdown pressure of said formation on said emulsion for a sufficient length of time within the range from about 0.1 to about 2 hours to fracture said formation and to cause said propping agent to be carried into and lodge in said fractured formation while maintaining the emulsion, and then producing said well to remove only said emulsion from said fractured formation and to obtain said hydrocarbons immediately at an increased production rate whereby said formation matrix permeability is not affected adversely and ultimate recovery of said hydrocarbons is increased.

References Cited in the file of this patent
UNITED STATES PATENTS 2,742,426   Brainerd _____ Apr. 17, 1956